United States Patent
Yamazaki et al.

(10) Patent No.: US 6,446,532 B1
(45) Date of Patent: Sep. 10, 2002

(54) TURNING MACHINING TOOL

(75) Inventors: Tsunehiko Yamazaki; Naoe Fukumura, both of Nagoya; Masayoshi Mizukado, Kani; Kazuhiro Kikata, Gifu; Sadami Miyazaki, Konan; Koichi Maki, Nagoya, all of (JP)

(73) Assignee: Yamazaki Mazak Kabushiki Kaisha (JP)

( * ) Notice: Subject to any disclaimer, the term of this patent is extended or adjusted under 35 U.S.C. 154(b) by 0 days.

(21) Appl. No.: 09/651,956

(22) Filed: Aug. 31, 2000

(30) Foreign Application Priority Data

Jun. 23, 2000 (JP) .......................................... 2000-189408

(51) Int. Cl.⁷ .............................................. B23B 41/00
(52) U.S. Cl. ................................ 82/1.5; 82/82; 82/128; 82/86
(58) Field of Search ............................ 82/1.5, 1.4, 1.3, 82/1.2, 1.11, 82, 83, 86, 113, 128 P

(56) References Cited

U.S. PATENT DOCUMENTS

| | | | | |
|---|---|---|---|---|
| 4,750,392 A | * | 6/1988 | Hong | 82/1.2 X |
| 4,945,792 A | * | 8/1990 | Gardner | 82/1.2 |
| 5,086,676 A | * | 2/1992 | Gifford et al. | 82/1.11 |
| 5,141,063 A | * | 8/1992 | Quesenbury | 175/267 |
| 5,159,862 A | * | 11/1992 | Byrnes et al. | 82/1.11 |
| 5,967,007 A | * | 10/1999 | Scheer | 82/1.5 |

FOREIGN PATENT DOCUMENTS

| | | |
|---|---|---|
| AU | 0 922 528 A | 6/1999 |
| DE | 35 11 790 A | 10/1986 |
| DE | 37 16 115 A | 12/1988 |

OTHER PUBLICATIONS

Patent Abstracts of Japan, dated Mar. 24, 1998.

* cited by examiner

*Primary Examiner*—Henry Tsai
(74) *Attorney, Agent, or Firm*—Wolf, Block, Schorr and Solis-Cohen LLP; Richard P. Gilly

(57) ABSTRACT

The turning machining tool has a main body 2 forming tool holding portion 3. An insert holding portion 12 is provided to the main body so as to being rotatably in a predetermined plane. A insert 13 is detachably attached to the insert holding portion 12. A rotation drive means 5,6,9,10,11,17,19 for the insert holding portion 12 is provided to the main body. It is possible to freely and rotatably drive the insert holding portion 12 in the predetermined plane. Therefore, it is possible that the insert 13 takes various machining positions for main body 2. So, various machining such as the bag hole machining becomes possible.

4 Claims, 2 Drawing Sheets

TURNING MACHINING TOOL

BACKGROUND OF INVENTION

This invention concerns the turning machining tool of which the tip is mobile. As a conventional turning machining tool, it is known that the insert is fixed at the tip of the rodlike tool main body. Recently, turning machining by machine tool tends to be complicated and upgraded. Then, the development of the possible turning machining tool of taking various tool positions is desired. This invention is considered and is made in the superscription circumstance. The purpose of this invention is to offer turning machining tool in which the various tool positions are taken. This invention is realized by doing the tip that the insert is fixed mobile.

SUMMARY OF THE INVENTION

The invention of claim 1 is that turning machining tool comprising:
- a main body having a tool holding portion; an insert holding portion provided with said main body being rotatably in a predetermined plane;
- an insert is detachably attached to said insert holding portion; and
- a rotatably driving means for said insert holding portion is provided to said main body.

With the invention of claim 1, it is possible to rotatably operate the insert holding portion in the predetermined plane. Therefore, it is possible that the insert takes various machining positions for the main body. And, various machining such as the bag hole machining becomes possible.

The invention of claim 2 is that turning machining tool as set forth in claim 1, wherein said rotatably driving means having a driving motor and a power transmitting mechanism that connects said driving motor and said insert holding portion.

With the invention of claim 2, it is possible to easily position the insert by rotating and driving the drive motor.

The invention of claim 3 is that turning machining tool as set forth in claim 2, wherein said power transmitting mechanism having a inversion prevention mechanism for preventing a inversion of said driving motor which causes in such a manner that a torque from said insert holding portion is transmitted to said driving motor. This inversion prevention mechanism is a break attached to a drive motor 5 or a worm 17 and a worm wheel 19, for example.

With the invention of claim 3, the inversion prevention mechanism prevents the situation in which the drive motor is reversed by the torque from the insert holding portion that is transmitted to aforesaid drive motor. Therefore, it is prevented that the insert carelessly moves under machining. Then, the offer of the turning machining tool of which the reliability is high becomes possible.

The invention of claim 4 is that turning machining tool as set forth in claim 1; wherein said turning machining tool is a tool for inside diameter machining.

With the invention of claim 4, it is possible to carry out inside diameter machining of various forms.

The invention of claim 5 is that turning machining tool as set forth in claim 1; wherein said turning machining tool is a tool for outside diameter machining.

With the invention of claim 5, it is possible to carry out outer diameter machining of various forms.

DESCRIPTION OF THE PREFERRED EMBODIMENT

In the following, practical examples of this invention are explained based on the drawings.

Figure 1B:
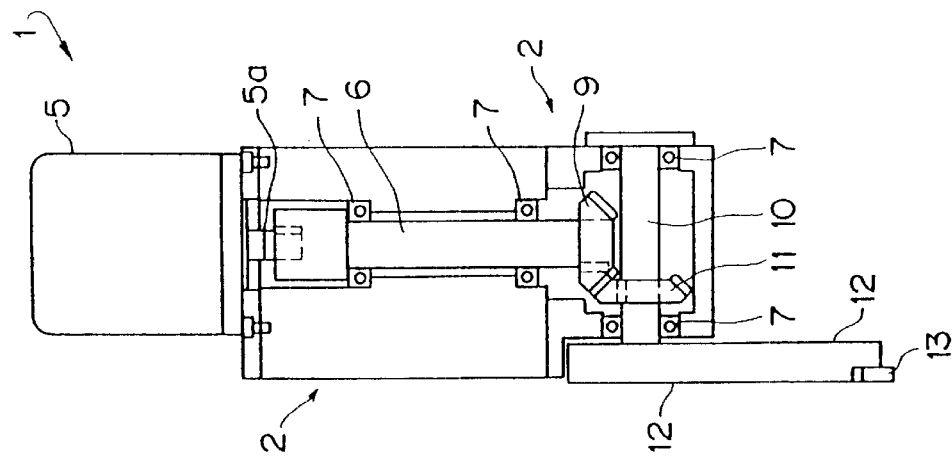
FIG. 1b is a sectional view of the machining tool of FIG. 1a taken along line 1b–1b.
Figure 1A:
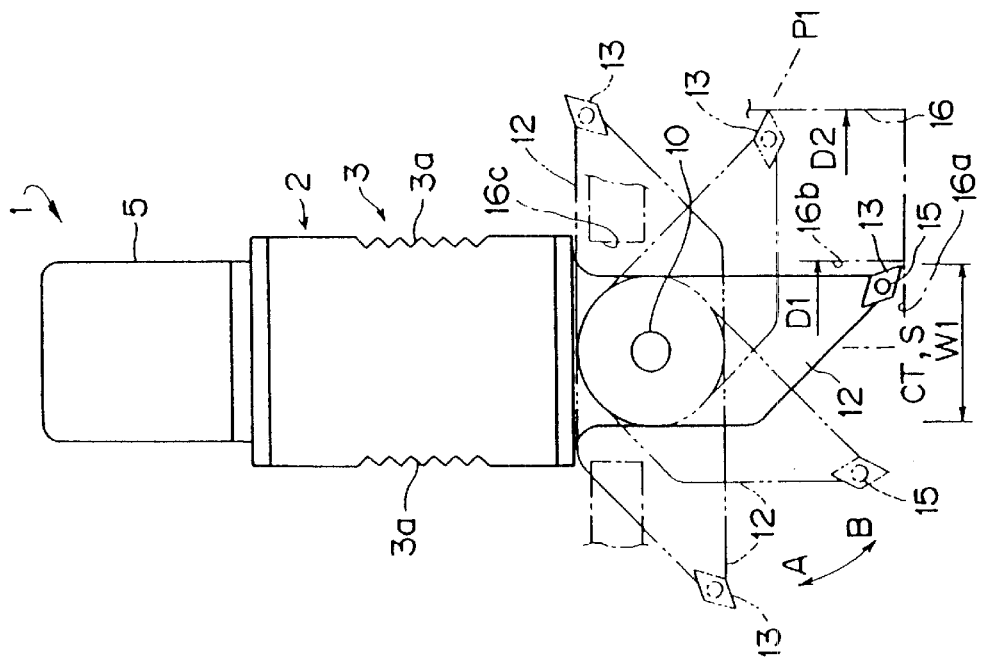
FIG. 1a is a plan view that shows one example of an inside diameter machining tool that this invention is applied.

An inside diameter machining tool 1 which is the turning machining tool has a main body 2 formed in the almost cylindrical, as it is shown in FIGS. 1a and 1b. At the central portion of the main body 2, a tool holding portion 3 is formed. An engaging groove 3a engaging for tool holding mechanism which is provided to a tool rest of not illustrating machine tool has been formed in the tool holding portion 3. At the upper part in the FIG. of the main body 2, a drive motor 5 with brake is attached. At a output shaft 5a of the drive motor 5 with brake, a shaft 6 is connected. At the inside of the main body 2, the shaft 6 is rotatably supported through bearings 7. A bevel gear 9 is fixed at the lower end in the Figure of the shaft 6. A Shaft 10 is geared with the bevel gear 9 through a bevel gear 11. Through bearings 7, the shaft 10 is similarly and rotatably supported. At the shaft 10, an insert holding portion 12 is fixed.

The insert holding portion 12 is rotatably provided for the main body 2 in such a manner that it rotates with the shaft 10 as its center in the predetermined plane in arrow A, B direction. And, at the tip of the insert holding portion 12, an insert 13 is detachably attached through a set screw 15.

The inside diameter machining tool 1 has the composition like the above. In the case of inside diameter machining of the workpiece using the inside diameter machining tool 1, this inside diameter machining tool 1 is attached to the tool rest of a machine tool which is not shown through the tool holding portion 3 thereof. In this condition, this inside diameter machining tool 1 is used as well as an usual inside diameter machining tool for the workpiece.

In this time, the drive motor 5 is appropriately driven to rotate. Through the shafts 6,10, the bevel gears 9,11, the insert holding portion 12 is rotated and is driven in the arrow A, B direction. Then, in the arrow A, B direction, the insert 13 attached to the tip of the insert holding portion 12 can oscillate and move over the W1 width of the insert holding portion 12. Therefore, it is possible that the insert 13 takes various positions for the main body 2. Therefore, in the first stage of inside diameter machining, for example, the inside diameter machining tool 1 is moved downward in the Figure in such a state that the insert holding portion 12 is positioned in an usual standby position S. By this, the inside diameter machining tool 1 machines the end face 16a of a driven workpiece 16 which rotates about an axial center CT as its center so as to bore a prepared hole 16b with the D1 diameter. In addition, the drive motor 5 is driven afterwards, the insert holding portion 12 is rotated and is driven in the arrow B direction, and the insert 13 is gradually moved to a position P1. So the prepared hole 16b is machined in such a manner that the diameter of the hole 16b is expanded to the diameter D2 corresponding to the position P1.

And, it is also possible to easily carry out machining of what is called the bag hole, which shape is that a workpiece entrance 16c part is narrow and a back part is wide, like the following by such composition. That is to say, the inside diameter machining tool 1 is inserted into the hole from the entrance 16c in the condition that the inside diameter machining tool 1 is positioned at a standby position S. In such a state, the insert holding portion 12 is appropriately rotate in the arrow A, B direction so as to machine the workpiece.

Still, the output shaft 5a of the drive motor 5 is retained in the arrest state, because it has the brake function. Therefore, the drive motor 5 isn't carelessly reversed with the cutting resistance that works from the insert 13. The insert holding portion 12 and the insert 13 are surely retained at predetermined angle position about the shaft 10 as its center, which is rotated and indexed by the drive motor 5.

Figure 2C:
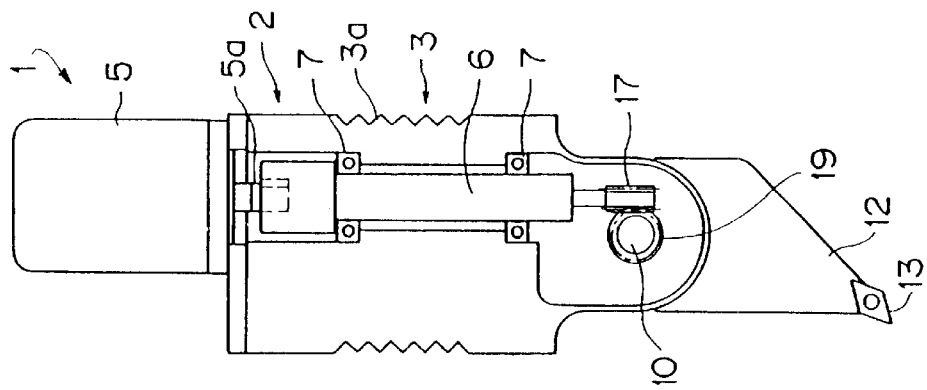
FIG. 2c is a sectional view of the machining tool of FIG. 2a taken along line 2c–2c.
Figure 2B:
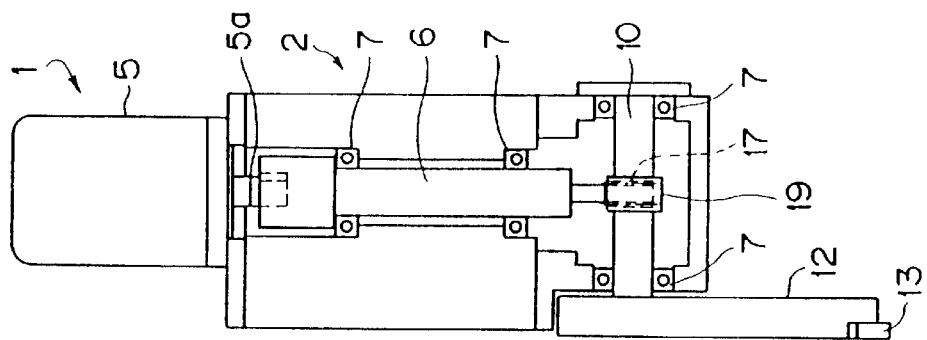
FIG. 2b is a sectional view of the machining tool of FIG. 2a taken along line 2b–2b.
Figure 2A:
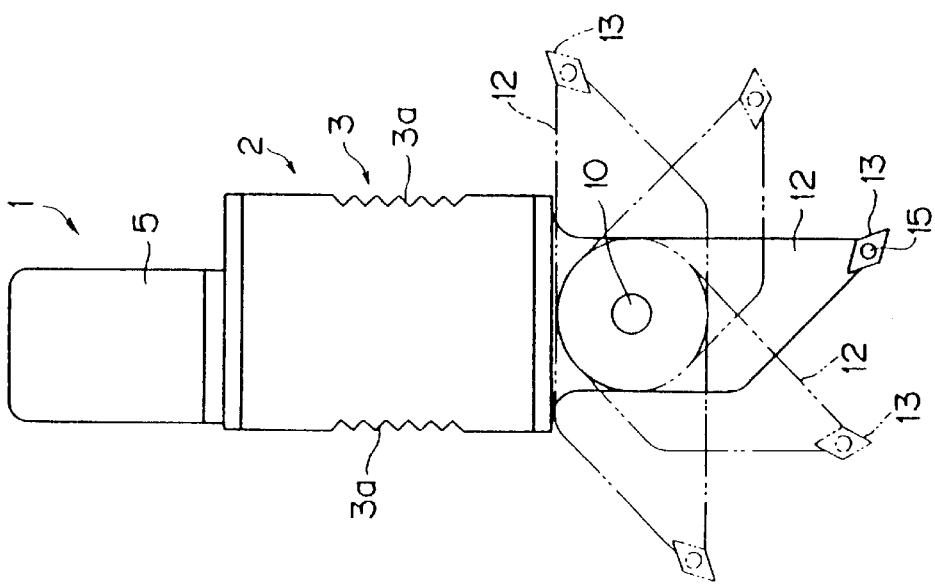
FIG. 2a is a plan view which shows another example of an inside diameter machining tool that this invention is applied sectional view in the bottom.

Again, instead of the bevel gears 9,11, the insert holding portion 12 may be rotated and may be driven by using a worm 17 and a worm wheel 19, as it is shown in FIGS. 2a–2c. In this case, there is no necessity of installing the brake in the drive motor 5 side by inversion prevention function of the worm 17 and the worm wheel 19. Still, by appending the identical code to the part that is identical with FIGS. 1a and 1b, the description of the part is omitted.

The above-mentioned embodiment explained the case of the inside diameter machining tool as the turning machining tool that this invention is applied. Naturally and however, it is also possible to apply this invention to the turning tool for outer diameter machining without limiting to the inside diameter machining tool.

The present invention is explained based on the embodiments described above. Embodiment described for this invention is exemplification, and it is not limited. And, the range of the invention be shown by the attached claims, and it is not restricted for the description of the embodiment. Therefore, the deformation and change belong to the claims are within this invention.

What is claimed is:

1. Turning comprising:
   a main body having a tool holding portion;
   an insert holding portion provided with said main body and being rotatable in a predetermined plane;
   an insert detachably attached to said insert holding portion;
   a rotatable driving means for said insert holding portion and provided with said main body, said rotatable driving means comprised of a driving motor and a power transmitting mechanism for connecting between said driving motor and said insert holding portion;
   a tool holding portion formed at a side face of said main body, capable of holding a tool by engaging with a tool holding mechanism of a machine tool; and
   said driving motor provided on a side opposed to a side of said main body on which said insert holding portion is provided, putting said tool holding portion between said insert holding portion and said driving motor.

2. Turning machine tool as set forth in claim 1, wherein said power transmitting mechanism has an inversion prevention mechanism for preventing an inversion of said driving motor which causes a torque from said insert holding portion to be transmitted to said driving motor.

3. Turning machining tool as set forth in claim 1, wherein said turning machining tool is a tool for inside diameter machining.

4. Turning machining tool as set forth in claim 1, wherein said turning machining tool is a tool for outside diameter machining.

* * * * *